Fig. 1

INVENTOR
MICHAEL BEN COTTON

April 7, 1959 M. B. COTTON 2,880,617
GYROSCOPIC APPARATUS

Filed Jan. 26, 1956 5 Sheets-Sheet 5

INVENTOR
MICHAEL BEN COTTON
BY
Herbert H. Thompson
ATTORNEY

United States Patent Office 2,880,617
Patented Apr. 7, 1959

2,880,617

GYROSCOPIC APPARATUS

Michael Ben Cotton, East Molesey, England, assignor to The Sperry Gyroscope Company Limited, Brentford, England, a company of Great Britain Application January 26, 1956, Serial No. 561,626

Claims priority, application Great Britain January 28, 1955

28 Claims. (Cl. 74—5.47)

This invention relates to systems and apparatus for aeroplanes, which systems and apparatus include tilt detectors and are arranged to stabilise a platform carried in the aeroplane, or the aeroplane itself, against erroneous tilting movements. The platform referred to may be, for example, an aeroplane, a gyroscopically stabilised element of a gyroscopic instrument or system such as the rotor case of a gyro horizon, a follow-up element in such an instrument or system, or a platform which is maintained at an angular relation to the aeroplane corresponding to the desired angular relation between the aeroplane and at least one external reference direction (such as the vertical) and from which is derived signals for operating, or correcting the operation of control surfaces to turn the aircraft to maintain the angular relation between the platform and the external reference direction substantially constant. The invention also relates to tilt detectors suitable for use in such systems and apparatus.

A tilt detector, or an accelerometer, such as a mercury switch or a pendulum constrained to move in one plane, has what may be called an axis of response. The detector responds to components of gravitational and acceleration forces which lie along this axis, but not to components perpendicular to the axis. In the case of a mercury switch tilt detector the axis of response generally lies along the longitudinal axis of the switch, while in the case of a pendulum constrained to move in one plane, the axis of response lies along the tangent to the path of its centre of gravity.

More generally, a tilt detector usually consists essentially of a two-part device, comprising a "fixed" part which is mounted on the object or platform whose tilt is to be measured, and a movable part which moves in relation to the fixed part in response to the action of gravitational and acceleration forces, the fixed part having pick-off means (such as electrical contacts) which provides a signal commensurate with or in response to components of relative motion of the fixed and movable parts which are directed along an axis of the fixed part, but which provides no signal commensurate with or in response to components of relative motion, if any, which are directed perpendicularly to the said axis of the fixed part. This axis will be hereinafter referred to as the axis of response.

A complex tilt detector may be constituted by a pair of proportional response tilt detectors having their axes of response mutually directed at right angles and a resolver, the resolver comprising a pair of primary windings having their axes mutually directed at right angles and respectively arranged to be supplied with energising signals by the tilt detectors, and a secondary winding having an axis rotatable in a plane parallel to the plane through the axes of the primary windings. Such a complex tilt detector, considered as a whole, is to be regarded as having an axis of response which is dependent on the angular position of the secondary winding axis in relation to the axes of the primary windings.

It has long been appreciated that a tilt detector arranged to measure tilt of the platform about a roll axis will be affected by centrifugal force during a turn, and, in the absence of special preventive measures, the tilt detector will produce an erroneous roll error signal which will result in an erroneous angular positioning of the platform about the roll axis. The preventive measures proposed or put into practice have included interrupting the path of the signal from the tilt detector to a roll correction motor so as to render the roll correction motor inoperative during a turn, and arranging that both a roll correction motor and a pitch correction motor be operated during a turn in response to signals from a pitch detector. These preventive measures may be brought into effect by conditions prevailing during a turn, or by the operation of means for initiating a turn or bank.

However, it has been discovered that not only a roll detector, but a pitch detector may produce signals erroneously indicating tilt of the platform as a result of centrifugal force occurring during a turn. This can be explained in the following manner. With a standard set of conditions; load, speed, air density and so on, an aeroplane when flying straight and level moves through the air in a mean direction which can be precisely defined with reference to the aeroplane. This direction will be referred to hereinafter as that of the fore-and-aft axis of the aeroplane. During a turn, however, in otherwise similar conditions, the instantaneous direction of motion of the aeroplane, that is to say, the direction of the tangent to its path through the air, departs appreciably from the direction of the fore and aft axis. This is because the lift of the wings has to be increased so as to balance the resultant of the weight of the aeroplane and the centrifugal force occurring in the turn. The increased lift necessitates an increased angle of attack, hence, the fore-and-aft axis becomes "nosed-in" towards the centre of the turn, and if the turn is made without change in height, the fore-and-aft axis is also somewhat elevated at the forward end in relation to the horizontal.

Owing to this "nosing-in" of the fore-and-aft axis, a component of centrifugal force occurring in the turn must be directed along the fore-and-aft axis of the aeroplane, and a component of slightly less magnitude will be directed along the projection of the fore-and-aft axis on to the horizontal plane. A pitch responsive tilt detector having its axis of response aligned with either of these components of centrifugal force may operate so erroneously during a turn as to give rise to serious errors in the operation of a stabilising system.

The systems and apparatus to which the invention relates more particularly include a tilt detector (referred to hereinafter as a pitch detector) which responds to deviations from the horizontal of the fore-and-aft axis of an aeroplane, or of a normally horizontal axis which is on a relatively movable platform in an aeroplane and which is arranged to lie approximately in a vertical plane parallel to the vertical plane through the fore-and-aft axis. The response of the pitch detector provides a control quantity which is used to control servo means (such as a pitch-erecting torque motor, a servo motor, or aeroplane control surfaces) to reduce the said deviation from the horizontal. Such systems and apparatus will be referred to hereinafter as systems and apparatus "of the kind specified."

Systems of the kind specified thus include systems in which a relatively movable platform or the equivalent (such as a vertical gyroscope casing, a follow-up platform associated with a vertical gyroscope, or a platform stabilised by rate-responsive gyroscopes) is maintained substantially horizontal in an aeroplane by servo motors responsive to the indications of pitch and roll detectors associated with the platform. Further, they include automatic control systems in which a platform is supported in an aeroplane in a desired angular relationship therewith, and in which the movement or setting of the aeroplane controls is automatically influenced by the indications of pitch and roll detectors carried on the platform.

According to one aspect of the present invention, a stabilising system or apparatus of the kind specified is arranged during a turn to respond appropriately to signals from a pitch detector but has provision for eliminating or reducing an error in the operation of the servo means attributable to the effect on the pitch detector of a component of centrifugal force directed along the fore-and-aft axis of the aeroplane during the said turn.

According to a second aspect of the invention, a pitch detector suitable for a stabilising system or apparatus of the kind specified has an axis of response which is automatically varied in response to centrifugal force occurring during a turn.

In the stabilising system or apparatus, the control quantity which is used to control the servo means during a turn may be provided by a pitch detector having its axis of response directed during the turn at an angle to the projection of the fore-and-aft axis of the aeroplane on to the horizontal plane. In one embodiment including a platform or the equivalent which is kept substantially horizontal, a pair of pitch detectors is mounted on the platform with their axes of response relatively skewed in azimuth, means being included for rendering one or other of the pitch detectors ineffective during turns in a manner whereby errors in the operation of the servo means due to a component of centrifugal force directed along the fore-and-aft axis during the turn tend to be reduced. In another embodiment a vertical gyroscope having appreciable pendulous moment has a single pitch detector mounted on the gyroscope casing, or on a member which moves in pitch correspondingly with the gyroscope casing, so as to lie at an angle to the vertical plane through the fore-and-aft axis, whereby, for turns to one side, the error due to the mutually augmenting effects of pendulous moment of the gyroscope and a component of centrifugal force directed along the fore-and-aft axis is reduced from an excessive value to an acceptable value.

The stabilising system or apparatus, in another form may include a single pitch detector the axis of response of which is automatically varied in direction during a turn, preferably so that the axis of response lies perpendicularly to the resultant of centrifugal and gravitational force impressed on the pitch detector at least during a certain typical turning condition. Thus in apparatus including a platform or the equivalent on which the pitch detector is mounted and which the apparatus controls to maintain substantially level, the platform may be arranged to be turned automatically in azimuth in relation to the vertical plane through the fore-and-aft axis during a turn. In another arrangement, the pitch detector is arranged to be automatically turned in azimuth in relation to the platform. Again, the pitch detector, instead of being rotatable in azimuth in relation to the platform may be arranged to be tilted down at the front end in relation to the platform. The function of a single pitch detector rotatable in azimuth may be performed by a resolver and a pair of tilt detectors of the graded or proportional signal type mutually directed at an angle and supplying signals to the resolver, the arrangement being such that the resolver, during a turn, derives from the signals of the tilt detectors a signal equivalent to the signal which would be produced by one simple pitch detector having its axis of response automatically varied in direction in an appropriate manner during the turn.

The invention is not limited to arrangements for turning the axis of response of the pitch detector. Thus a stabilising system or apparatus may include a graded or proportional signal type pitch detector along whose axis of response a component of centrifugal force is directed during a turn and means operative during the turn for compensating the erroneous component of the pitch detector signal due to the action of centrifugal force on the pitch detector. The compensating means may operate to modify a signal from the pitch detector before that signal is applied to an erection or servo motor. Where the platform is the casing of a vertical gyroscope, the compensating means may operate to apply a compensating torque to the gyroscope during the turn.

In those embodiments of the invention in which the axis of response of the pitch detector is rotatable in relation to a platform maintained substantially level, the axis of response may in most instances, be automatically rotated through an angle of fixed value for each direction of turn, or may be automatically rotated through an angle computed to suit the actual turn made. In many cases the provision for eliminating or reducing pitch error due to centrifugal force in a turn may either be arranged to become effective in response to means for initiating the turn or the bank, or may be arranged to become effective in response to conditions prevailing during a turn, such as centrifugal force, change in the angle of attack, or bank of the aircraft.

Stabilising systems and apparatus of the kind specified sometimes include an accelerometer arranged to cut out, during excessive fore-and-aft acceleration of the aeroplane, a control action normally effected in response to a signal from the pitch detector. Where a system or apparatus according to the invention includes such an accelerometer, a component of centrifugal force directed along the fore-and-aft axis during turns may be of sufficient magnitude to bring the accelerometer into operation. In such a case, means must be provided to prevent the cutting out of the control action in any properly executed turn. Such means may take the form of provision for rotating the accelerometer to maintain its axis of response substantially perpendicular to the resultant of gravitational and centrifugal forces occurring during a turn, or of means for rendering the response of the accelerometer ineffective to cut out the control action during turns.

A system or apparatus according to the invention which includes a vertical gyroscope having appreciable pendulous moment and a pitch detector giving a graduated or proportional response, may be modified by having the pitch detector so directed during turns that it produces a signal which evokes from the pitch-erection torque motor a torque opposite and substantially equal to the torque impressed on the gyroscope about the roll axis by reason of the said pendulous moment.

The system or apparatus is preferably arranged not only to eliminate or reduce errors due to the effect of centrifugal force on a pitch detector, but to reduce or eliminate errors due to the effect of centrifugal force on a roll detector. To this end, the signal from the roll detector is preferably rendered ineffective to operate the servo or torque motor providing correction about the roll axis. The roll-correction servo or torque motor may thus be rendered inoperative during turns, or it may be arranged to operate in response to signals from the pitch detector.

The invention has a third aspect according to which a stabilising system or apparatus including a stabilised platform mounted to rotate about a "pitch" axis with respect to a gimbal frame which rotates relatively to the aeroplane about a "roll" axis extending generally in the direction of the fore-and-aft axis has provision for varying the relative angular direction of the "roll" axis in relation to the fore-and-aft axis in response to a change in, or a condition accompanied by a change in, the angle of attack in a manner tending to maintain the roll axis more nearly in alignment with the relative wind. Preferably means responsive to the angle of attack, or to conditions which determine the angle of attack, is adapted to maintain the "roll" axis substantially aligned with the projection of the relative wind direction on to the plane of symmetry of the aeroplane. Due to the platform remaining level when the aeroplane is banked over in the turn, the platform and the pitch detector mounted upon it is turned outwardly with respect to the aeroplane by the angle between the fore-and-aft axis and the roll axis, multiplied by the cosine of the angle of bank. When the roll axis is parallel with the relative wind direction, the pitch detector is turned in azimuth by the precise amount necessary to avoid centrifugal force error in the pitch detector.

In order that the invention may be clearly understood and readily carried into practice, a number of embodiments will now be specifically described by way of example, with reference to the accompanying drawings. In the drawings.

Figure 1:
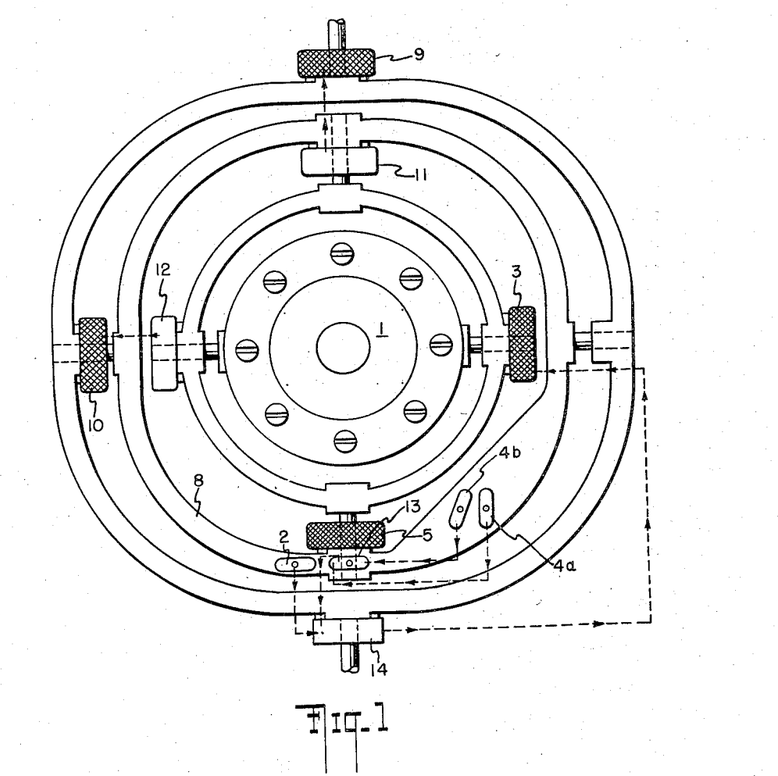
Fig. 1 shows a vertical gyroscope provided with a pair of pitch detectors relatively skewed in azimuth.

Referring now to Fig. 1, a vertical gyroscope 1 has a roll detector 2 which supplies a controlling signal to roll erection torque motor 3, and a pair of mercury switch pitch detectors 4a and 4b which control a pitch erection torque motor 5. The pitch detectors and roll detector are mounted not on the gyroscope casing but on a follow-up platform 8 which is maintained level with the gyroscope casing by roll and pitch servo motors 9 and 10. Servo motors 9 and 10 are respectively responsive to signals from roll and pitch pick-offs 11 and 12.

Pitch erection torque motor 5 receives signals from both pitch detectors 4a and 4b during straight flight by way of a centrifugal-force-responsive mercury switch 13. During turns, when the centrifugal force exceeds a predetermined value, the switch 13 appropriately cuts out one or other of the pitch detectors according to the direction of the turn.

A pitch-roll switch 14 responsive to the angle between the outer gimbal ring and the aeroplane is arranged in a known manner to control the roll torque motor appropriately from the operative pitch detector instead of from the roll detector when the bank exceeds a predetermined magnitude.

The axes of the two pitch detectors may be so directed as to be aligned with the relative wind over the aeroplane during a particular typical turning condition for turns to either side. Each should then be directed in relation to the vertical plane through the fore-and-aft axis of the aeroplane at an angle equal to the angle between the relative wind direction and the fore-and-aft axis multiplied by the cosine of the angle of bank, the angles concerned being those pertaining at the typical turning condition. The pitch detector selected by the switch 13 to remain operative has its axis nosed outwardly in relation to the centre of the turn.

In one case it was found, with a single pitch detector directed straight forward, that for turns to the right the erroneous signal caused by the response of the pitch detector to centrifugal force practically compensated for the effect of pendulous moment, while for turns to the left, the two errors, augmenting one another, reached a prohibitive total. Fig. 1 shows the pitch detectors angularly positioned to suit such a case, pitch detector 4a, operative during turns to the right, being directed parallel to the vertical plane through the fore-and-aft axis, while pitch detector 4b, operative during turns to the left is directed at about twice the angle first specified to the vertical plane through the fore-and-aft axis.

Figure 2:
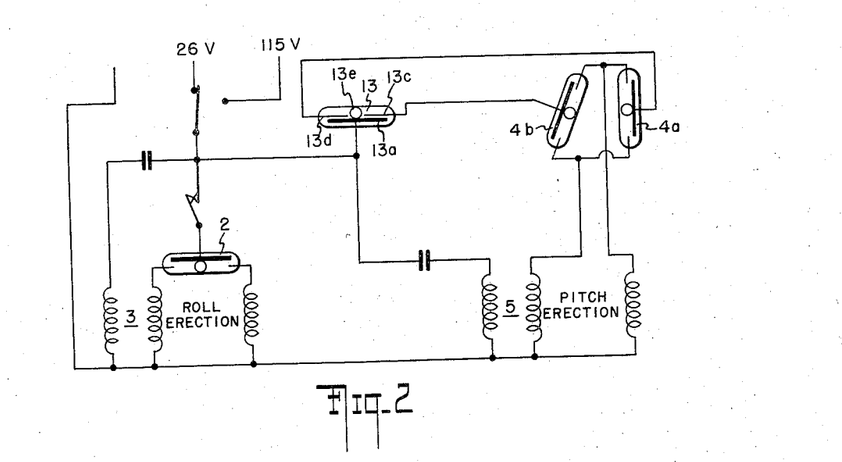
Fig. 2 is a circuit diagram for the embodiment of Fig. 1.

Fig. 2 is a circuit diagram showing one manner in which the pitch detectors 4a, 4b, and the centrifugal-force-responsive switch 13 are electrically connected. The switch 13 contains a centre electrode 13a, connected to one pole of the supply, and two end electrodes 13c, 13d respectively connected to centre electrodes of the pitch detectors 4b and 4a. The end electrodes 13c, 13d extend nearly to the centre of the switch, so that, when a mercury drop 13e is in the centre of the switch, the two end electrodes and hence the centre electrodes of both pitch detectors are connected to the supply, while when the mercury drop departs from its central position, only one of end electrodes 13c, 13d is connected by the drop to the centre electrode 13a and to the supply. Thus the centre electrode of one or other of the pitch detectors 4a and 4b is disconnected from the supply during turns according to the end of the switch 13 towards which the mercury drop 13e is deflected by centrifugal force.

Figure 3:
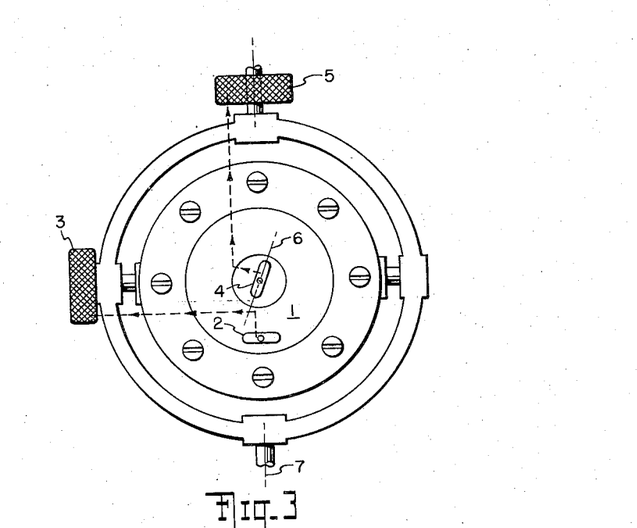
Fig. 3 shows a vertical gyroscope provided with a single pitch detector skewed in azimuth.

The embodiment of the invention shown in Fig. 3 is concerned with a vertical gyroscope 1 having appreciable pendulous moment which is a source of errors of about the same magnitude as the errors which would be due to components of centrifugal force acting along the axis of response of a pitch detector maintained parallel with the vertical plane through the fore-and-aft axis of the aeroplane. These errors are additive for turns in one direction and subtractive for turns in the other direction.

Thus if the gyroscope rotor rotates in a clockwise sense when viewed from above, a turn to the right, owing to the pendulous tendency causing it to swing out on the turn, tends to pitch the rotor axis rearwardly at the top. A component of centrifugal force acting rearwardly during a turn on a pitch detecting switch parallel with the vertical plane through the fore-and-aft axis results in the pitch erecting torque motor applying a torque such as to precess the gyroscope axis forwardly at the top. Thus the errors approximately cancel for turns to the right. In a turn to the left, however, the pendulous tendency of the gyroscope casing and the erroneous action of the pitch detecting mercury switch both result in the top of the gyroscope being precessed forwardly, so that the errors augment each other for turns to the left, and may reach a prohibitive value.

In accordance with the invention, a single pitch detector 4 is set skewed in azimuth so that it operates less erroneously for turns to one side, the right in the present instance, and more erroneously for turns to the other side. For example, it can be angularly set so as to operate correctly, that is to say, to lie along the direction of relative wind, during a given, typical, left turning condition. Then the precession error of the gyroscope will be due to pendulous moment alone for turns to the left. For turns to the right, the pitch detector error will be roughly doubled, and the total error will be approximately equal to the original pitch detector error. In this manner the errors may be substantially equalised for turns to either side, and prevented from reaching a prohibitive value.

In order to prevent the roll-erection torque motor 3 responding to erroneous signals from the roll detector due to the lateral component of centrifugal force during turns, known means (not shown) is provided for rendering the roll erection circuit inoperative during turns. For example, the roll detector switch 2 may be arranged to cut itself out under excessive gravitational or acceleration forces directed along its axis of response.

Figure 4:
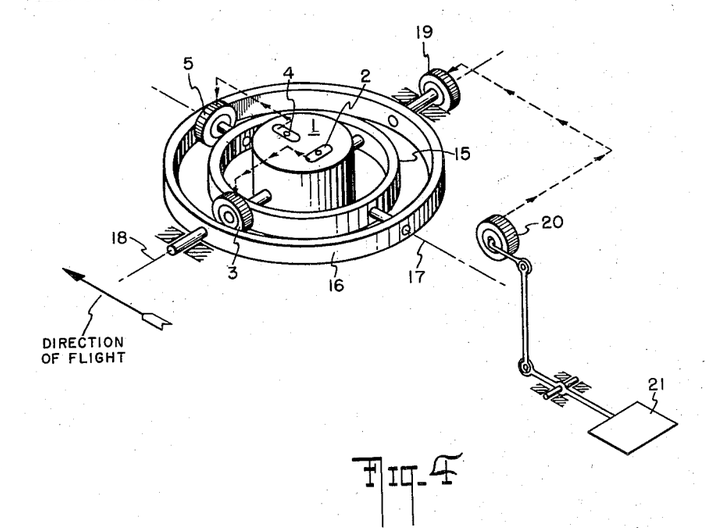
Fig. 4 shows a vertical gyroscope provided with a roll axis which is variable in direction to vary the direction of the pitch detector.

In the embodiment shown in Fig. 4, a vertical gyroscope 1 has a mercury switch roll detector 2 which supplies a controlling signal to roll erection torque motor 3 and a mercury switch pitch detector 4 which supplies a controlling signal to pitch erection torque motor 5. The pitch erection motor 5 operates about an axis 17 which is maintained in alignment with the air path of the craft, except in conditions of sideslip, whatever the angle of attack. To this end, the gimbal ring 15 of the gyroscope is supported from an auxiliary gimbal ring 16 and rotates in relation thereto about a generally forwardly directed axis 17. The gimbal ring 16 is pivoted about a pitch axis 18, and the axis 17, when there is no sideslip, is maintained along the direction of relative wind by means of a pair of synchros 19 and 20 respectively mounted on the axis 18 and connected to wind vane 21. As in the previous embodiment, the roll detector 2 is arranged to cut out in an excessive apparent roll condition such as occurs in a turn.

The pitch detector 4 has its axis of response lying in, or parallel to a plane which passes through the axis 17, and which is maintained substantially vertical. Hence, during a properly executed turn, that is to say, when there is no sideslip or change in height, the axis of response of the pitch detector when correctly positioned lies parallel to the direction of relative wind projected on to the horizontal plane. Accordingly there is no component of centrifugal force directed along the axis of response of the pitch detector, so that there is no erroneous response of pitch detector 4 to centrifugal force during the turn.

The embodiment of Fig. 4 may be modified in various ways. For example, instead of the wind vane 21, other means responsive to the airflow may be employed to determine the direction of relative wind. Again, the direction of relative wind may be determined by a computer which is responsive, for example, to air speed and to acceleration along the yaw axis of the aeroplane.

Further, to provide an approximate correction, means responsive to a condition prevailing during a turn, or to the operation of means for initiating a turn or bank may be arranged to tilt the axis 17 through a fixed angle corresponding to the change in direction of relative wind in a particular typical turning condition. In yet another modification, the axis 17 is permanently directed at an angle to the fore-and-aft axis. In the latter modification, the pitch detector is directed precisely parallel with the vertical plane through the fore-and-aft axis when the aeroplane is not banked, while when bank is applied, the gyroscope casing with the pitch detectors thereon is automatically turned outwardly in azimuth. However, the correction will be precise only at one rate of turn for any given speed.

Figure 5:
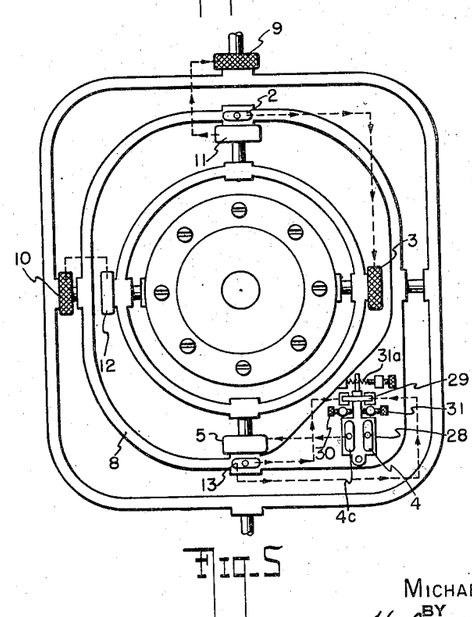
Figs. 5, 6 and 7 show ways in which the axis of response of a pitch detector may be turned in azimuth with respect to a stabilised platform.

Fig. 5 shows a vertical gyroscope arrangement generally similar to that of Fig. 1. One difference is that a single pitch detector 4 is employed and is mounted on a cradle 28 which is pivoted to turn in azimuth with respect to the follow-up platform 8. Centrifugal-force-responsive mercury switch 13 controls electro magnet 29 to swing the cradle to one side or the other against adjustable screws 30, 31. Adjustable spring means 31a maintains the axis of response of pitch detector 4 parallel with the vertical plane through the fore-and-aft axis when the electro-magnet 29 is de-energised, and the adjustable screws 30, 31 are set so that the axis of response of pitch detector 4 lies in the vertical plane through the relative wind during particular typical turning conditions for turns to either side.

Signals from pitch detector 4 to pitch erection torque motor 5 go by way of an accelerometer cut-out 4c which cuts out the torque motor 5, in a known manner, under excessive fore-and-aft acceleration. Accelerometer cut-out 4c is also mounted on the cradle 28 so as not to be erroneously operated by a component of centrifugal force during turns.

Figure 6:
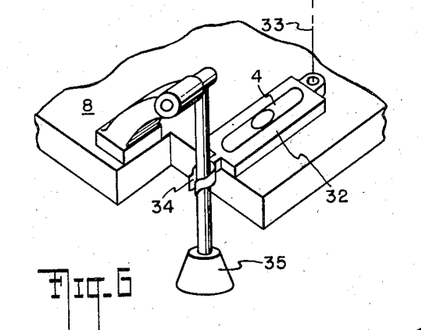

Fig. 6 shows one manner in which the embodiment of Fig. 5 may be modified. The pitch detector 4 is mounted on a cradle 32 which is rotatable in azimuth in relation to the platform 8 about an axis 33. A pendulum 35 pivotally hung at a level above the pitch detector has its arm embraced by a fork 34 on the end of cradle 32.

The direction of flight of the aeroplane in which the stabilising system including the pitch detector of Fig. 6 is fitted should be downward and to the left in relation to the drawing. During a turn, it will be clear that the pendulum 35 will swing out under the effect of centrifugal force and will turn the cradle in azimuth, relatively to the platform, in a sense opposite to the sense of the turn.

The correction given by the arrangement of Fig. 6 will be precise only at one rate of turn for any given speed. The relative proportions of the parts may readily be calculated from the angle of bank and the direction of relative wind when the particular turning conditions in which precise correction is required have been decided upon.

Various modifications of the embodiment of Fig. 6 are possible. Thus, instead of the pendulum swinging freely during the turn, it may urge the cradle 32 against a preferably adjustable stop, or the action of the pendulum may be opposed by spring means tending to centre the cradle 32.

Figure 7:
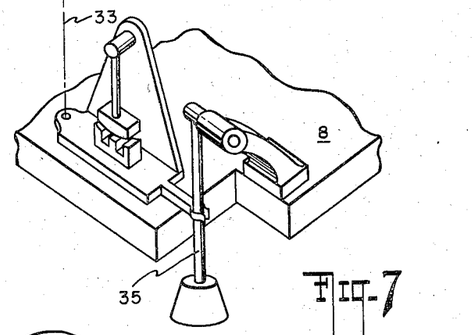

The application of the invention is not, of course, confined to systems employing pitch detectors of the liquid-level type. Fig. 7 shows the arrangement of Fig. 6 with the liquid level pitch detector replaced by a pitch detector comprising an E-type pick-off and an armature hung as a pendulum above the pick-off. Such a pitch detector is shown, for example, in the embodiment illustrated in Fig. 2 of the specification of British Patent No. 715,313. That specification, incidentally is concerned with an automatic control system in which a platform is supported in an aeroplane in an angular attitude with respect to the aeroplane corresponding to the desired attitude of the aeroplane with respect to an external frame of reference. The movement or setting of the aeroplane controls is automatically influenced by the indications of pitch and roll detectors carried by the platform. It will be appreciated that the invention is no less applicable to such a system or apparatus than to systems and apparatus centred around a vertical gyroscope which provides a constant vertical reference.

Figure 8:
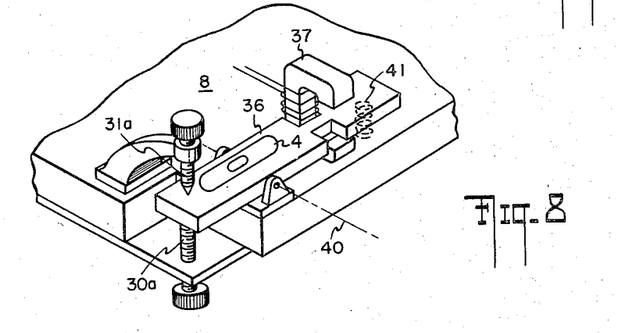
Fig. 8 shows the manner in which a compensating downward tilt may be applied to a pitch detector.

Fig. 8 shows a pitch detector arrangement which could be substituted for that of Fig. 5. A cradle 36 is pivotally mounted on the platform 8 to rock in a vertical plane about an axis 40. The cradle supports pitch detector 4 and may also, if desired, support an accelerometer cut out, which is not shown. The cradle 36 has only two positions, since it is arranged to be rocked down at the front by electro magnet 37 for turns to either side. A spring 41 normally maintains the cradle in engagement with an adjusting screw 30a, which is set to give a level attitude for the pitch detector. The setting of adjusting screw 31a determines the angle through which the cradle and pitch detector are tilted when electro magnet 37 is energised. This angle should be such as to bring the axis of response of the pitch detector perpendicular to the resultant of gravitational and acceleration forces during a particular, typical turning condition.

Figure 9:
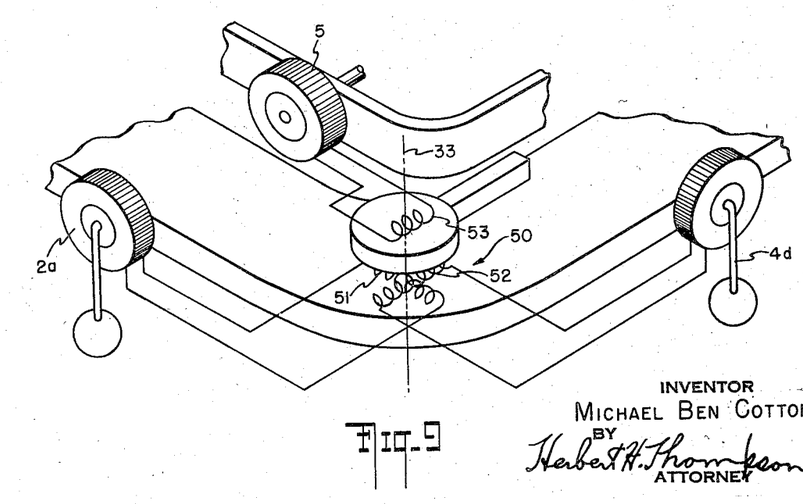
Fig. 9 shows a modification of the arrangement of Fig. 5 in which the single pitch detector is replaced by two tilt detectors and a resolver.

Fig. 9 shows another modification of the embodiment of Fig. 5 in which the function of a single pitch detector rotatable in azimuth is performed by a resolver 50 and a pair of proportional signal tilt detectors 2a and 4d. Each tilt detector comprises a selsyn and pendulum, and each is connected to an appropriate one of primary windings 51, 52 of resolver 50. The resolver 50 has a secondary winding 53 which puts out a signal to pitch erecting torque motor 5. The secondary winding is rotatable with respect to the primary windings about an axis 33. In straight flight, the axis of the secondary winding is maintained parallel with the axis of primary winding 52 supplied by the tilt detector 4d which has its axis of response directed along the fore-and-aft axis of the aeroplane. Consequently the signal applied to pitch-erection motor 5 corresponds to the output of tilt detector 4d alone. During a turn, the secondary winding is automatically turned in azimuth, for example in the manner shown in Fig. 5. The signal applied to pitch erection torque motor 5 then corresponds to components of the signals from both tilt detectors which together are equivalent to the signal which would be obtained from a single pitch detector having its axis of response maintained in alignment with the axis of secondary winding 53. The secondary winding may be automatically rotated in other ways than that shown in Fig. 5, for example it may be pendulum operated, or turned through an amount to suit the actual turn made in response to signals from a computer which is in turn responsive to signals dependent on a turning condition such as air speed and rate and sense of turn.

Figure 10:
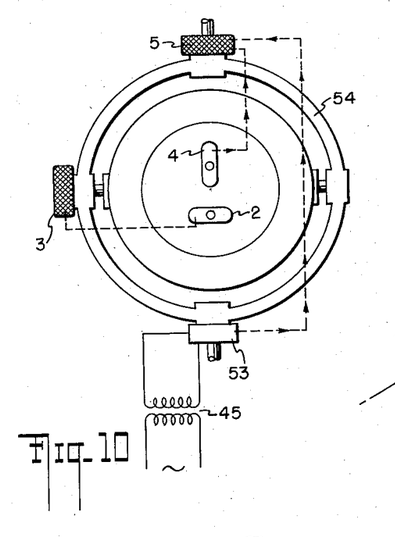
Fig. 10 shows a vertical gyroscope in which provision is made for applying a torque about the roll axis to compensate for the effect on the pitch detector of a component of centrifugal force during turns.

In the embodiment shown in Fig. 10 a vertical gyroscope has a roll detector 2 supplying a signal to roll erection torque motor 3 and a pitch detector 4 supplying a signal to pitch erection torque motor 5, all in a conventional manner. However, the pitch erection torque motor 5 includes an additional winding (not shown) arranged to be supplied with a biasing signal from source 45 by way of bank-responsive switch 53. The switch 53 is adapted to pass the biasing signal to pitch erection torque motor 5 whenever the bank of the aeroplane, as measured by the angle between the aircraft structure and the gimbal ring, exceeds a predetermined value. The biasing signal applied to motor 5 is of the same sense whatever the direction of bank; namely such as to tend to precess the gyroscope rearwardly at the top. The biasing signal thus opposes the tendency of the top of the gyroscope to precess forward in response to an erroneous signal from the pitch detector due to a component of centrifugal force directed along it.

The embodiment of Fig. 10 may be modified in various ways. For example, if the gyroscope has pendulous moment substantially compensating the effect on the gyroscope of the erroneous response of the pitch detector to centrifugal force for turns to one side, a compensating torque which also tends to neutralise the pendulous effect may be applied only during turns to the other side. Instead of applying a compensating signal to an additional winding for the pitch-erection torque motor, provision may be made for modifying the pitch detector signal by the compensating signal before applying it to a single torque motor winding.

Figure 11:
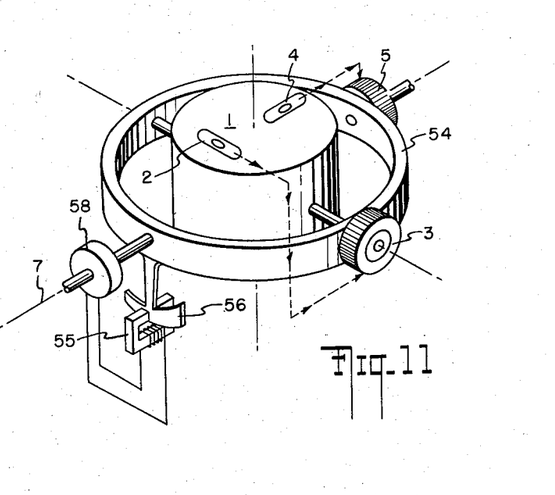
Fig. 11 shows a modification of Fig. 10 in which the compensating torque is variable with the angle of bank.

Fig. 11 shows means for applying a compensating torque which varies automatically with the bank of the aeroplane. A vertical gyroscope 1 having pitch and roll erection torque motors 5 and 3 respectively responsive to signals from conventionally orientated pitch and roll detectors 4 and 2 mounted on the gyroscope casing, has an additional compensating motor arranged to provide a torque about the roll axis between gimbal ring and the aeroplane structure.

The compensating motor comprises an electro magnet 55 fixed in relation to the aircraft structure and embracing between its poles an armature 56 which is fixed in relation to the gimbal ring 54 and hence rotates about the roll axis 7 of the instrument. The electro magnet 55 is automatically energised by the operation of a switch 58 responsive to the bank of the aeroplane as measured by the vertical gyroscope. The armature 56 is shaped to provide a torque which is suitably varied according to the amount of bank.

It is not possible to define the armature shape precisely because of fringing effects and recourse must be had to experiment to derive the exact shape necessary. An approximate expression for the form of the armature may be obtained as follows:

At a typical given speed and load, when the relative wind lies along the fore-and-aft axis the wings will meet the air at a typical angle of attack. During a banked turn, however, the angle of attack will be increased to provide the centripetal force opposing centrifugal force. The angle of attack in the turn will be approximately the typical angle of attack mutliplied by the secant of the angle of bank. The nosing-in angle of the aeroplane, measured in azimuth, is the change in the angle of attack multiplied by the sine of the angle of bank; that is to say the angle of attack multiplied by the difference between the secant of the angle of attack and one.

The centrifugal force acting on the aeroplane transversely is the weight multiplied by the tangent of the bank angle. The component of this directed backward along the fore-and-aft axis is the transverse force multiplied by the sine of the nosing-in angle. Since the angle of attack is small, this gives as an approximate figure for the backward component of centrifugal force, the weight multiplied by the typical angle of attack multiplied by the square of the tangent of the bank angle multiplied by the differenece between one and the cosine of the angle of bank.

Now the torque produced by the reaction between the electro magnet and the shaped armature is approximately the differential of the area of the armature between the poles with respect to the angular position of the armature, multiplied by the square of the flux density.

Assuming proportional response of the pitch detector, it is apparent that the compensating torque should vary in proportion to the backward component of centrifugal force.

By integration, it can be shown that when the armature is rotated about the roll axis from a mean position through the angle of bank, the dimension of the armature, measured from the roll axis of the instrument should be changed from a mean value by an amount proportional to the tangent of the angle of bank minus the angle of bank plus the sine of the angle of bank minus the logarithm of the sum of the secant and tangent of the angle of bank.

An armature based on the above shape, but corrected for fringing effects, will give correction for various rates of turn for one condition of speed and load, when the electro magnet is suitably energised.

When the speed of the aeroplane is changed, however, a part of the above expression, namely the sine of the angle of bank minus the logarithm of the sum of the secant and tangent of the angle of bank remains unchanged, while the other part, namely the tangent of the angle of bank minus the angle of bank has to be multiplied by the square of the quotient of the typical speed divided by the new speed.

Accordingly, it is not possible to obtain precise correction for variations of both speed and bank by varying the energization of the electro magnet according to a function of the air speed. However, a modification of the above embodiment can be constructed with two motors, one having a constantly energized electro magnet and co-operating with an armature shaped in conformity with the unchanging part of the expression given, while the other has an electro magnet energized so that its flux density is proportional to the new speed divided by the typical speed, and is shaped in conformity with the tangent of the angle of bank minus the angle of bank.

Figure 12:
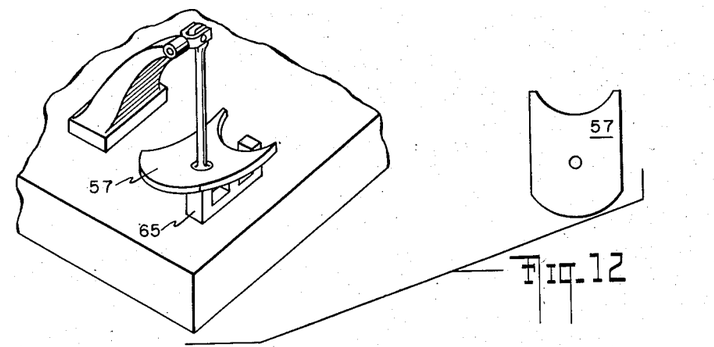
Fig. 12 shows a E-type pick-off version of a pitch detector modified in accordance with the present invention.

Fig. 12 shows a pitch detector adapted to change the direction of its axis of response in response to an approximately transverse component of centrifugal force. The pitch detector is of the kind comprising an armature 57 swinging as a pendulum over an E-type pick-off 65. The pick-off in a well known manner, puts out an alternating current signal voltage which is dependent for its polarity on the sense of the departure of the armature from a null position, and which is of amplitude commensurate with the magnitude of such departure.

The pitch detector is modified according to the invention by mounting the armature so that it can swing not only in a fore-and-aft direction, but sideways. Further, the armature is widened so as to remain in operative relation with the pick-off through a substantial angle of bank and has its side edges displaced forwardly in the manner shown, in relation to the centre portion. Now when the armature swings sideways under a transverse component of centrifugal force of substantial magnitude, it will be apparent that the null position of the armature is moved rearwardly. Thus the pitch detector gives a zero reading when acted upon by a resultant force (centrifugal force and gravity) which lies at an angle to the plane of the pick-off. In other words, the direction of the axis of response is changed.

Figure 13:
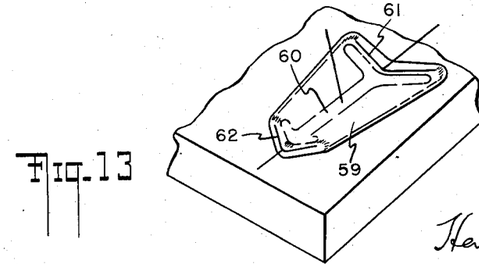
Fig. 13 shows a liquid-level type of pitch detector modified in accordance with the present invention.

Fig. 13 shows a liquid level type of pitch detector adapted to change the direction of its axis of response when acted upon by an appreciable transverse component of centrifugal force. It is analogous to a combination of the two pitch detectors and the centrifugal force response switch of the embodiment described by reference to Figs. 1 and 2. The pitch detector now to be described provides in effect not only two skewed pitch detectors but an additional one directed along the plane through the fore-and-aft axis.

The pitch detector comprises a glass envelope 59 containing a drop of mercury, a centre electrode 60 and two end electrodes 61 and 62. When the pitch detector is tilted forwardly or backwardly, the mercury bridges the gap between the centre electrode and one or other of the end electrodes, enabling a selective signal to be obtained from the pitch detector.

As will be seen from the drawing, the space enclosed by the envelope is of V-section, and provides three principal paths for the mercury drop; a centre path at the lower vertex of the V, and a pair of side paths at the ends of the respective arms of the V. The centre path in normal flying conditions lies substantially along the fore-and-aft axis and hence along the direction of relative wind during straight flight, while the side paths are directed to lie along the direction of relative wind during turns to either side at a typical predetermined rate and speed.

Between the centre paths and the side paths the glass is sloped upwardly, so that the mercury drop is automatically transferred from the centre path to an appropriate one of the side paths during a turn. It will be seen that the slope between the centre and side paths varies from one end of the pitch detector. The effect of this is that there is not a precise value of centrifugal force, but a range of such values over which the transfer can occur. This range can be narrowed by relatively increasing the length of the arms of the V-section in relation to the length of the pitch detector.

Various modifications may be made to the embodiment of Fig. 13 without departing from the invention. Where there is a vertical gyroscope with appreciable pendulous moment, one of the side paths provided by the pitch detector may be dispensed with, so that a side path is provided for turns to one side, while a "centre" path is provided for straight flight or for turns to the other side. With regard to the V-section of the space enclosed by the envelope, the upper envelope wall can obviously be flat, or any other suitable shape.

Another modification of the embodiment of Fig. 13 provides suitable compensation during a variety of turning rates for a selected typical speed and load condition.

In that modification the lower surface of the envelope is of a tapered trough shape such as would be built up by a succession of plane strips perpendicular to the resultant of centrifugal force and gravity for successive rates of turn. By making these strips infinitesimally small, a smooth curved surface may be obtained. Lines directed along the strips correspond to paths followed by the mercury drop at various turning rates. These paths are skewed more in azimuth than the corresponding paths in the embodiment of Fig. 13, but have a compensating upward tilt at the front end, whereas the paths provided in the embodiment of Fig. 13 are normally horizontal.

It will be understood that the embodiments of the invention hereinbefore described may be varied widely without departing from the scope of the invention. Most of the embodiments have been described as including a vertical gyroscope, but the invention is equally applicable to other forms of stabilising systems or apparatus. The stabilising system or apparatus may control a visual indicator, or provide a vertical reference for an automatic pilot, or both.

Any embodiment may include an accelerometer arranged to cut out a control action during excessive fore-and-aft acceleration and provided with means for preventing cutting out during turns under the action of a longitudinally directed component of centrifugal force. This preventive means may operate by changing the direction of the axis of response of the accelerometer, for example, or by shunting contacts opened by the cut out by a switch responsive to a transverse component of centrifugal force.

Where the stabilising system or apparatus forms part of an automatic pilot, the provision for eliminating or reducing an error in the operation of the servo means attributable to the effect on the pitch detector of a longitudinally directed component of centrifugal force may be arranged to come into effect, in many cases, in response to the operation of means for initiating a turn or bank. The embodiments illustrated in Figs. 1 and 2 or Figs. 4, 5, 8, 9 or 10 may be modified in this manner.

I claim:

1. In stabilizing apparatus for an airplane, relatively movable platform means, pitch detector means on said platform means which responds to deviations of a normally horizontal axis that is arranged to lie approximately in a vertical plane parallel to the vertical plane through the fore-and aft axis of said airplane for providing a control signal in accordance therewith, servo means responsive to said control signal for reducing the said deviations from the horizontal, said pitch detector means having an axis of response and including means for varying the direction of said axis of response in accordance with centrifugal force occurring during a turn.

2. Apparatus as claimed in claim 1 including a base, a cradle mounted to rotate in azimuth with respect to said base for carrying said pitch detector means and a pendulum mounted on said base in a manner allowing it to swing outwardly during turns and which is mechanically connected to the cradle in a manner whereby the platform means is rotated with respect to the base in a sense opposing the sense of the turn.

3. Apparatus as claimed in claim 1 wherein said pitch detector means includes an E-type pick-off having an armature hung as a pendulum adjacent the ends of the pick-off legs wherein the armature is arranged to move along the plane of the pick-off and transversely thereof and is so shaped that the longitudinal null position varies with the transverse position of the armature, whereby when centrifugal force of a predetermined value moves the armature transversely of the pick-off from a symmetrical position with respect to the plane of the "E,"

the pitch detector means responds only to components of gravitational and acceleration forces directed along an axis which lies at an angle to the plane of the "E."

4. Apparatus as claimed in claim 1 including an electrically insulating envelope containing a plurality of electrodes and a conductive liquid that partially fills the envelope for making contact between adjacent pairs of electrodes in a manner corresponding to the pitch attitude of the pitch detector means, wherein the envelope is so shaped that in straight flight the conductive liquid follows a path parallel with a vertical plane of reference, while when the conductive liquid is subjected to more than a predetermined value of centrifugal force during the turn the liquid follows a path which is skewed in azimuth in relation to the vertical plane of reference and in a sense opposing that of the turn.

5. In a stabilizing system for aircraft, pitch detector means for providing signals in accordance therewith, servo means responsive to said pitch signals, and compensating means for minimizing the error in the operation of the servo means attributable to the effect on the pitch detector means of a component of centrifugal force directed along the fore-and-aft axis of the aircraft during a turn of said aircraft.

6. Apparatus as claimed in claim 5 wherein the pitch signal which is used to control the servo means during a turn is provided by a pitch detector means having its axis of response directed during the turn at an angle to the projection of the fore-and-aft axis of the aircraft onto the horizontal plane.

7. A stabilizing system or apparatus as claimed in claim 6 including platform means which is kept substantially horizontal, said pitch detector means including a pair of pitch detectors mounted on the platform with their axes of response relatively skewed in azimuth, and means for selectively rendering one of the pitch detectors ineffective during turns in a manner whereby errors in the operation of the servo means due to a component of centrifugal force directed along the fore-and-aft axis during the turn tend to be reduced.

8. Apparatus as claimed in claim 7 including a vertical gyroscope having appreciable pendulous moment, wherein the pitch detectors are so directed that errors in the operation of the gyroscope due to the combined effect of pendulous moment of the gyroscope and a component of centrifugal force directed along the fore-and-aft axis during a turn tend to be reduced.

9. A stabilizing system or apparatus as claimed in claim 7 wherein the axes of response of the pitch detectors are skewed in azimuth in opposite senses in relation to the vertical plane through the fore-and-aft axis of the aircraft.

10. Apparatus as claimed in claim 6 including a vertical gyroscope having appreciable pendulous moment wherein said pitch detector means includes a single pitch detector mounted on the gyroscope casing so as to lie at an angle to the vertical plane through the fore-and-aft axis, whereby, for turns to one side, the error which would be caused by the mutually augmenting effects of pendulous moment of the gyroscope and a component of centrifugal force directed along the fore-and-aft axis is reduced from an excessive value to an acceptable value.

11. Apparatus as claimed in claim 6 wherein said pitch detector means includes a single pitch detector and means for automatically varying the angle of response of said pitch detector during a turn.

12. Apparatus as claimed in claim 10 wherein the pitch detector is turned so that its axis of response lies perpendicularly to the resultant of centrifugal and gravitational force impressed on the pitch detector at least during a certain typical turning condition.

13. Apparatus as claimed in claim 11 including a gyroscope having appreciable pendulous moment, wherein the axis of response of the pitch detector is so directed that errors in the operation of the gyroscope due to the combined effect of pendulous moment of the gyroscope and a component of centrifugal force directed along the fore-and-aft axis during a turn tend to be reduced.

14. Apparatus as claimed in claim 11 including a platform on which the pitch detector is mounted and which the apparatus controls to maintain substantially level wherein the platform is arranged to be turned automatically in azimuth in relation to the vertical plane through the fore-and-aft axis during a turn.

15. Apparatus as claimed in claim 14 including a gimbal frame pivoted to the aircraft structure on an axis which is directed downwardly during a turn at the front end in relation to the fore-and-aft axis, said platform being pivoted about a "pitch" axis to said gimbal frame, whereby, during a banked turn, the axis of response of the pitch detector is turned in azimuth outward at the front and in relation to the vertical plane through the fore-and-aft axis.

16. Apparatus as claimed in claim 15 wherein the axis on which the gimbal frame is pivoted is permanently directed at a predetermined angle to the fore-and-aft axis.

17. Apparatus as claimed in claim 15 including means wherein the axis on which the gimbal frame is pivoted is arranged to be turned from an angular position substantially parallel to the fore-and-aft axis to a down-at-the-front angular position during a turn.

18. Apparatus as claimed in claim 17 wherein the gimbal frame axis is arranged to be automatically turned through a fixed angle in response to conditions prevailing during a turn.

19. Apparatus as claimed in claim 17 wherein the gimbal frame axis is arranged in response to conditions prevailing during a turn to be turned through an angle to suit the actual turn being made.

20. Apparatus as claimed in claim 11 including a platform which the apparatus controls to maintain substantially level and which supports the pitch detector wherein the pitch detector is arranged to have its axis of response automatically turn in azimuth in relation to the platform.

21. Apparatus as claimed in claim 11 including a platform normally maintained horizontal, and means for tilting the pitch detector down at the front end during turns in relation to the platform.

22. Apparatus as claimed in claim 20 including a resolver having primary and secondary windings, and a pair of tilt detectors of the proportional signal type mutually directed at an angle for supplying signals to the primary windings of the resolver, said secondary winding being automatically turned in relation to the primary windings during turning of the aircraft.

23. Apparatus as claimed in claim 11 including means for automatically turning the axis of response of the pitch detector in accordance with centrifugal force occurring during a turn.

24. Apparatus as claimed in claim 5 wherein said pitch detector means includes a proportional signal type pitch detector along whose axis of response a component of centrifugal force is directed during a turn, and means operative during the turn for compensating the erroneous component of the pitch detector signal due to the action of centrifugal force on the pitch detector.

25. Apparatus as claimed in claim 24 including a vertical gyroscope having appreciable pendulous moment, and a pitch erection motor, wherein the means for compensating the erroneous component of the pitch detector signal includes means for compensating the tendency for the pitch erection motor to respond erroneously to the pitch detector signal due to the effect of centrifugal force on the pendulous gyroscope.

26. Apparatus as claimed in claim 5 including fore-and-aft accelerometer means arranged to provide a cut-out signal during excessive fore-and-aft acceleration, and means for preventing the aforesaid acceleration cut-out signal from becoming effective as a result of the nose-in attitude assumed by the aircraft during a turn.

27. In a stabilizing system for an airplane, a gimbal frame, a stabilized platform mounted to rotate about a "pitch" axis with respect to said gimbal frame which rotates relatively to said airplane about a "roll" axis extending generally in the direction of the fore-and-aft axis and means for varying the relative angular direction of the "roll" axis in relation to the fore-and-aft axis in response to a change in the angle of attack for maintaining the "roll" axis more nearly in alignment with the relative wind.

28. Apparatus as claimed in claim 27 including means responsive to a function of the angle of attack for maintaining the "roll" axis substantially aligned with the projection of the relative wind direction onto the plane of symmetry of the airplane.

References Cited in the file of this patent

UNITED STATES PATENTS

| | | |
|---|---|---|
| 2,419,063 | Fischer | Apr. 15, 1947 |
| 2,530,154 | Davis | Nov. 14, 1950 |
| 2,542,975 | Adkins | Feb. 27, 1951 |
| 2,620,669 | Braddon | Dec. 9, 1952 |
| 2,630,017 | Slater | Mar. 3, 1953 |
| 2,728,233 | Fowler | Dec. 27, 1955 |